(12) United States Patent
Kitaori et al.

(10) Patent No.: US 8,587,176 B2
(45) Date of Patent: Nov. 19, 2013

(54) SALIENT POLE CONCENTRATED WINDING STATOR FOR ELECTRIC MOTOR

(75) Inventors: Ken Kitaori, Wako (JP); Nobuhiro Iitaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 130 days.

(21) Appl. No.: 13/283,584

(22) Filed: Oct. 28, 2011

(65) Prior Publication Data

US 2012/0104893 A1   May 3, 2012

(30) Foreign Application Priority Data

Nov. 1, 2010   (JP) ................................ 2010-245628

(51) Int. Cl.
*H02K 3/28* (2006.01)

(52) U.S. Cl.
USPC .......................................... 310/194; 310/195

(58) Field of Classification Search
USPC .......................................... 310/194, 195, 269
See application file for complete search history.

(56) References Cited

U.S. PATENT DOCUMENTS

| | | | |
|---|---|---|---|
| 6,975,056 B2 * | 12/2005 | Okada et al. ................... | 310/194 |
| 7,193,345 B2 * | 3/2007 | Shinzaki et al. ................ | 310/71 |
| 7,626,294 B2 * | 12/2009 | Ohta et al. ...................... | 310/71 |
| 7,795,767 B2 * | 9/2010 | Ueta et al. ....................... | 310/71 |
| 2004/0263015 A1 * | 12/2004 | Okada et al. .................... | 310/194 |
| 2007/0080592 A1 * | 4/2007 | Ohta et al. ...................... | 310/71 |

FOREIGN PATENT DOCUMENTS

| | | |
|---|---|---|
| JP | 2001-193715 | 7/2001 |
| JP | 2008-193889 | 8/2008 |
| JP | 2008-312290 | 12/2008 |
| JP | 2008312290 A * | 12/2008 |
| JP | 4465395 B2 | 11/2009 |
| JP | 2010-142075 | 6/2010 |

OTHER PUBLICATIONS

JPO machine translation of JP 2008312290 A, Dec. 2008, Endo et al., all pages.*
Japanese Office Action for corresponding JP Application No. 2010-245628, Oct. 17, 2012.

* cited by examiner

*Primary Examiner* — Tran Nguyen
*Assistant Examiner* — Naishadh Desai
(74) *Attorney, Agent, or Firm* — Ditthavong Mori & Steiner, P.C.

(57) ABSTRACT

A salient pole concentrated winding stator for an electric motor includes an annular stator core and a plurality of coils. The annular stator core includes a plurality of teeth. The plurality of coils are wound around the teeth such as to have different phases on the teeth adjacent in a circumferential direction. Each of the coils includes a first winding end and a second winding end, and at least one of the ends extends across the coil of a different phase. An end portion of the first winding end of one of the coils of the same phase that are adjacent in the circumferential direction is directly joined to an end portion of the second winding end of the other coil to form a joint portion without using an electric-power collection/distribution member. The joint portion is covered with an insulating material.

13 Claims, 10 Drawing Sheets

SALIENT POLE CONCENTRATED WINDING STATOR FOR ELECTRIC MOTOR

CROSS-REFERENCES TO RELATED APPLICATIONS

The present application claims priority under 35 U.S.C. §119 to Japanese Patent Application No. 2010-245628, filed Nov. 1, 2010, entitled "Salient Pole Concentrated Winding Stator for Electric Motor." The contents of this application are incorporated herein by reference in their entirety.

BACKGROUND OF THE INVENTION

1. Field of the Invention

The present invention relates to a salient pole concentrated winding stator for an electric motor.

2. Discussion of the Background

FIG. 13 illustrates a stator 101 for a rotary electric machine disclosed in Japanese Patent No. 4465395. The stator 101 includes an electric-power collection/distribution member 113 provided with annular bus rings 141U, 141V, and 141W corresponding to a plurality of phases. The annular bus rings 141U, 141V, and 141W include lead frames 142 and connection terminals 144 fixed to the lead frames 142, and are stored in an electric-power collection/distribution member housing section 132b, and the lead frames 142 are connected to stator coils 134 by the connection terminals 144. This structure reduces the size of the rotary electric machine while ensuring a desired output.

In the disclosed stator 101 for the rotary electric machine, after the bus rings 141U, 141V, and 141W of the electric-power collection/distribution member 113, which are attached in the electric-power collection/distribution member housing section 132b and are fixed by fixing members 145, are connected to the stator coils 134 by the connection terminals 144, the electric-power collection/distribution member housing section 132b in which the electric-power collection/distribution member 113 (lead frames 142, fixing members 145, connection terminals 144) is stored is filled with insulating resin.

SUMMARY OF THE INVENTION

According to one aspect of the present invention, a salient pole concentrated winding stator for an electric motor includes an annular stator core and a plurality of coils. The annular stator core includes a plurality of teeth arranged at predetermined intervals in a circumferential direction and projecting radially. The plurality of coils are wound around the teeth such as to have different phases on the teeth adjacent in the circumferential direction. Each of the coils includes a first winding end located on a radial outer side at one axial end of the stator and a second winding end located on a radial inner side at the one axial end of the stator, and at least one of the first winding end and the second winding end extends across the coil of a different phase in the circumferential direction. An end portion of the first winding end of one of the coils of the same phase that are adjacent in the circumferential direction is directly joined to an end portion of the second winding end of the other coil to form a joint portion without using an electric-power collection/distribution member. The joint portion is covered with an insulating material.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
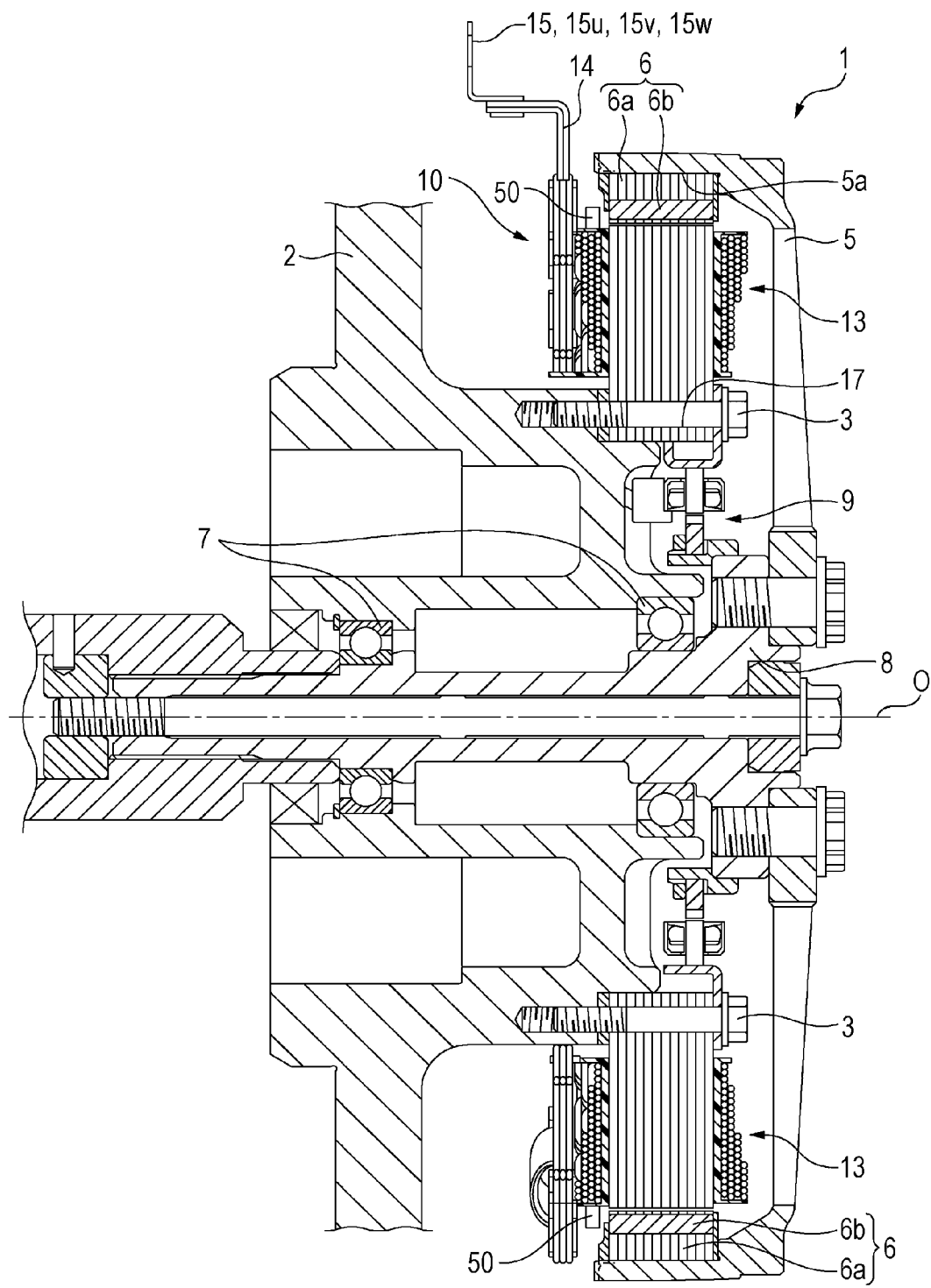
FIG. 1 is a longitudinal sectional view of an electric motor according to the embodiment of the present invention.

The embodiments will now be described with reference to the accompanying drawings, wherein like reference numerals designate corresponding or identical elements throughout the various drawings.

FIG. 1 is a longitudinal sectional view of an electric motor according to an embodiment of the present invention. As illustrated in FIG. 1, the electric motor of the embodiment is an outer rotor type electric motor 1 with three phases each including eight poles. The electric motor 1 includes a stator 10 that is fixed to a motor housing 2 with bolts 3 and is centered on an axis O, and an annular rotor 6 provided on a radial outer side of the stator 10 with a small gap being disposed therebetween.

The rotor 6 has a substantially annular shape in which magnets 6b are buried in a rotor core 6a formed by stacking electromagnetic steel sheets. The rotor 6 is fixed to an inner peripheral surface 5a of a flange portion of an arm member 5 shaped like a disk, and is corotatably fixed to a rotation shaft 8 that is rotatably supported by ball bearings 7 fitted in the motor housing 2. The rotor 6 is rotated by a rotating magnetic field generated in the stator 10. A resolver 9 for detecting the magnetic pole position of the rotation shaft 8 is provided between the rotation shaft 8, and the arm member 5 and the stator 10.

Figure 2:
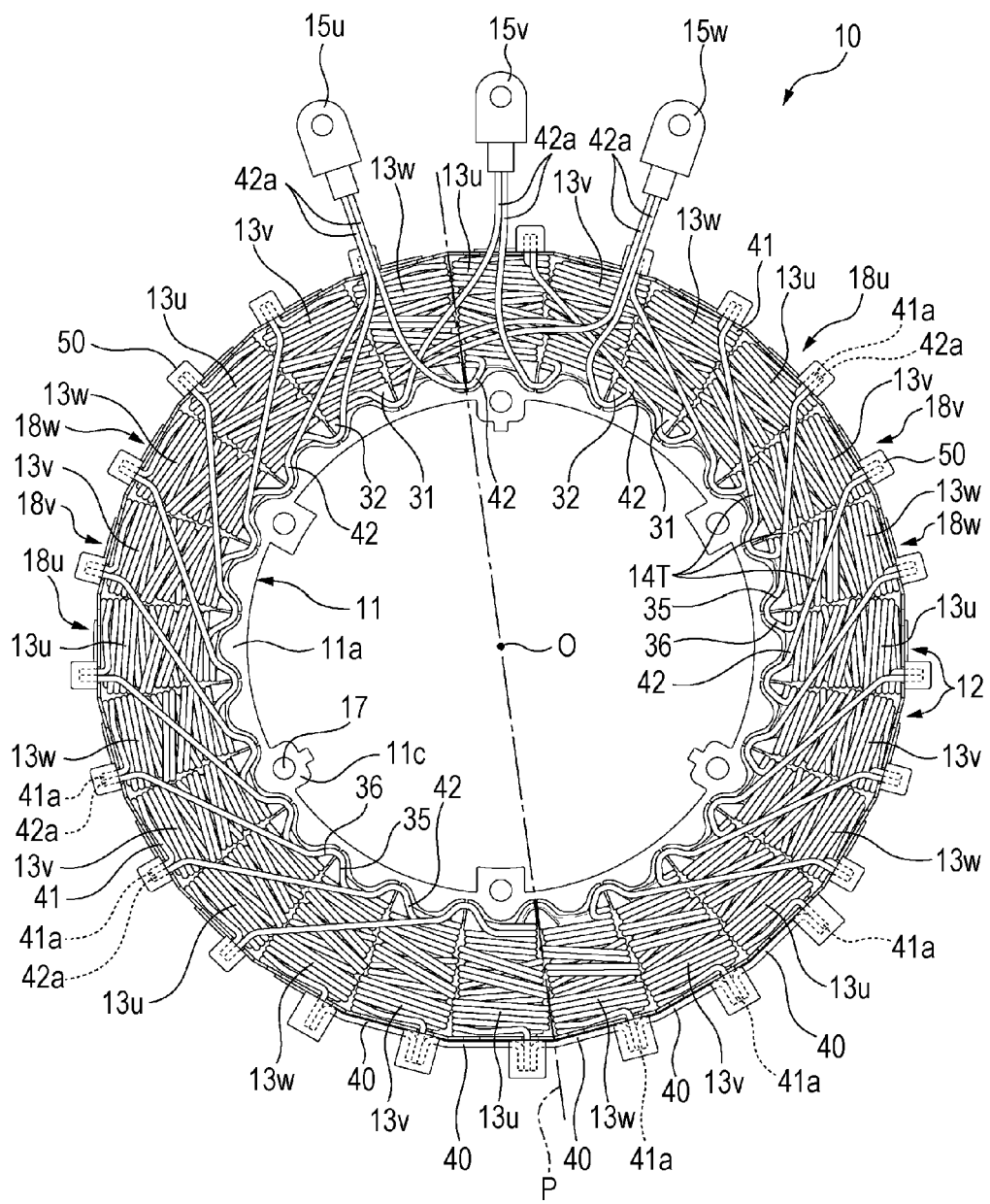
FIG. 2 is a front view of a stator illustrated in FIG. 1.
Figure 3:
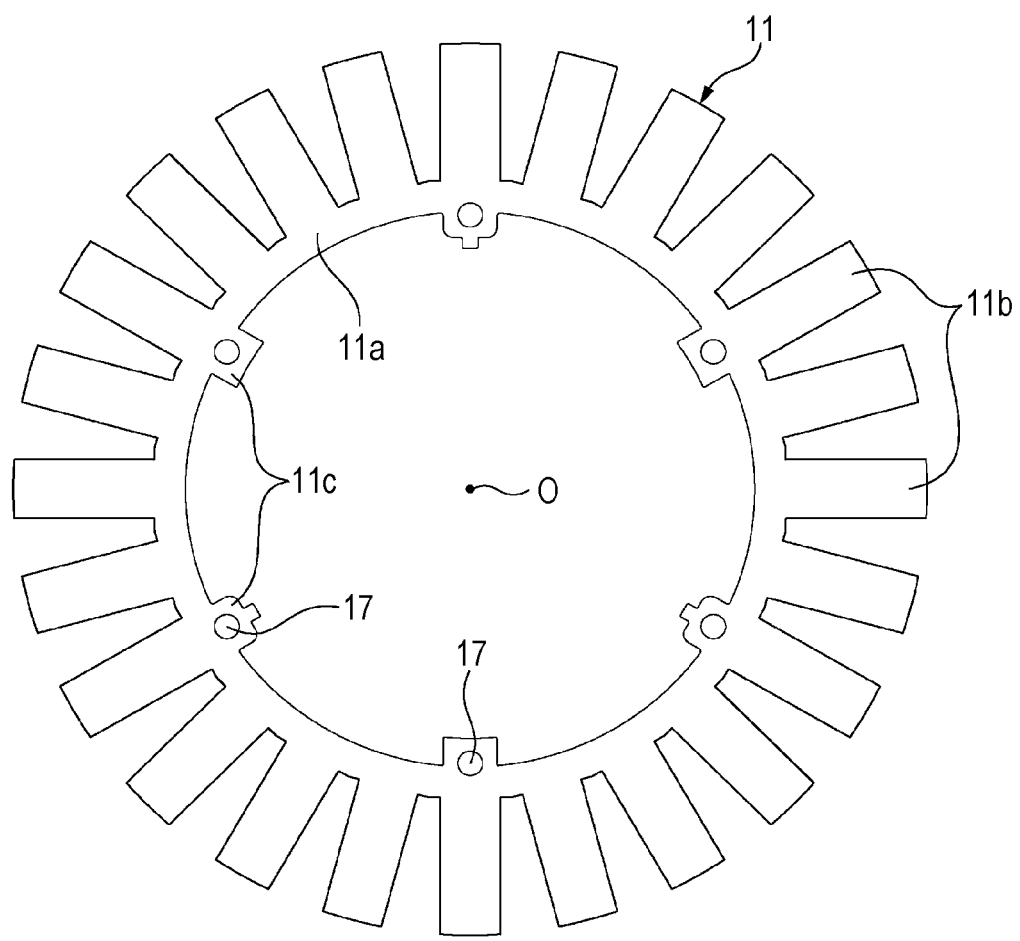
FIG. 3 is a front view of a stator core.

As illustrated in FIGS. 2 and 3, the stator 10 includes a stator core 11 and a plurality of (twenty-four in the embodiment) coils 13 (13u, 13v, 13w). The stator core 11 is formed by stacking a plurality of electromagnetic steel sheets in an axial direction of the stator 10, that is, in a direction perpendicular to the plane of FIG. 3, and includes a plurality of (twenty-four) teeth 11b. The teeth 11b radially project outward from an annular portion 11a in a radial direction, and are arranged in a circumferential direction. The stator core 11 is substantially annular as a whole. On an inner peripheral side of the annular portion 11a of the stator core 11, a plurality of (six in the embodiment) projections 11c having bolt holes 17 are provided. The bolts 3 are fitted in the bolt holes 17 so as to fix the stator 10 to the motor housing 2 (see FIG. 1).

Each of the coils 13 is formed by winding a wire including a predetermined number of conductive wires (a bundle wire formed by two conducive wires (parallel wire) in the embodiment, hereinafter referred to as a bundle wire) 14 around the corresponding tooth 11b in the stator core 11 in a salient pole concentrated wiring manner with an insulator 12 being disposed therebetween. For example, the insulator 12 is formed of insulating synthetic resin.

The coils 13 include three-phase coils, that is, eight U-phase coils 13u, eight V-phase coils 13v, and eight W-phase coils 13w. The U-phase coils 13u, the V-phase coils 13v, and the W-phase coils 13w are arranged in this order in the clockwise direction, and are wound around the teeth 11b. That is, the coils 13 of the same phase (e.g., U-phase coils 13u) arranged with the coils 13 of the other phases (e.g., V-phase coils 13v and W-phase coils 13w) being disposed therebetween are connected by a link portion 14T that is routed over the coils 13 of the other phases.

Figure 4:
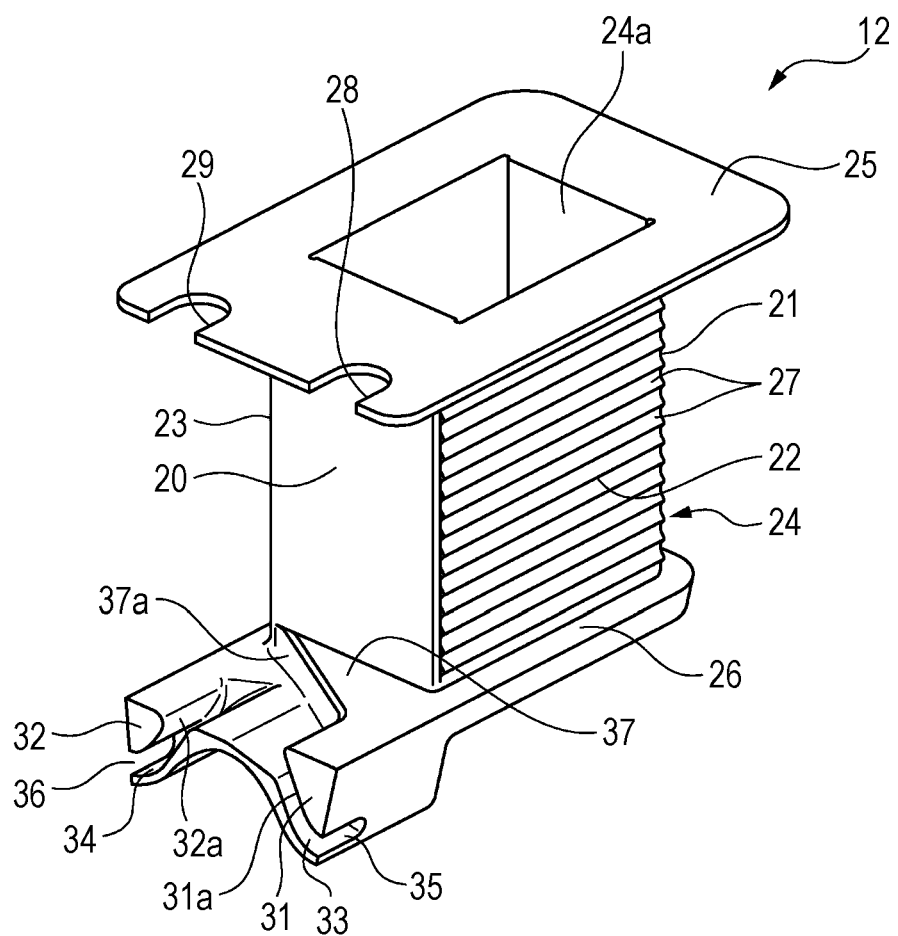
FIG. 4 is a perspective view of an insulator.

As illustrated in FIG. 4, each insulator 12 includes a body portion 24 around which the bundle wire 14 is wound, and an outer peripheral flange portion 25 and an inner peripheral flange portion 26 provided at radial opposite ends of the body portion 24. The body portion 24 is shaped like a cylinder of rectangular cross section by walls 20 and 21 opposing each other in the axial direction of the stator 10, walls 22 and 23 opposing each other in the circumferential direction of the stator 10, and a rectangular hole 24a penetrating in the radial direction. The rectangular hole 24a is slightly larger than each tooth 11b of the stator core 11 such that the tooth 11b can extend therethrough. The walls 22 and 23 have a plurality of grooves 27 extending in a direction orthogonal to the axial center of the rectangular hole 24a. The grooves 27 position the bundle wire 14 during winding.

At a wall 20 side end of the outer peripheral flange portion 25, a pair of substantially U-shaped grooves 28 and 29 are provided to be spaced from each other in the circumferential direction. One axial end portion of the inner peripheral flange portion 26 (wall 20 side) gradually increases in thickness from a middle portion toward both end faces in the circumferential direction, as viewed in the axial direction. At corners of the end faces in the circumferential direction and an outer side face in the radial direction of the inner peripheral flange portion 26, inner winding support portions 31 and 32 shaped like a substantially triangular prism project toward one axial end in the axial direction. In the one axial end portion of the inner peripheral flange portion 26, inclined faces 33 and 34 are provided to slope inward in the radial direction from the middle portion toward both end faces in the circumferential direction. The inclined faces 33 and 34 oppose radially inward inclined faces 31a and 32a of the inner winding support portions 31 and 32, thereby forming groove portions 35 and 36.

A guide portion 37 sloping relative to the wall 20 is provided at the boundary between the one axial end portion of the inner peripheral flange portion 26 and the wall 20. The guide portion 37 guides a portion of the bundle wire 14 to be first wound along the wall 20 from one end face in the circumferential direction (right end face in FIG. 4) to the other end face in the circumferential direction (left end face in FIG. 4). The guide portion 37 has a stepped portion 37a that guides the bundle wire 14 in the axial direction from the groove portion 35 to the body portion 24.

Figure 5A:
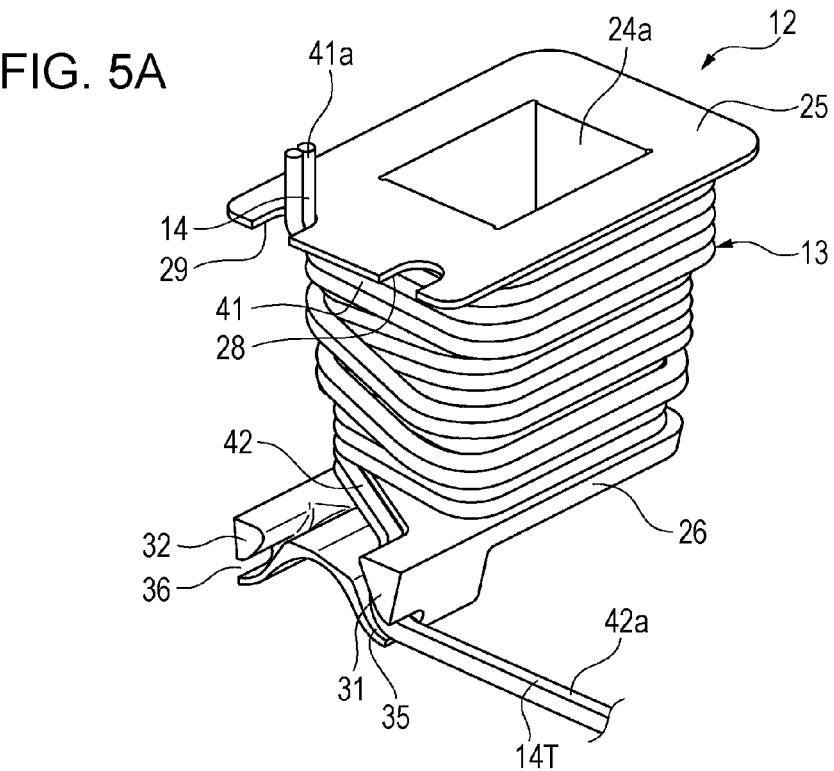
FIG. 5A is a perspective view of a first coil in which a wire is wound around an insulator.
Figure 5B:
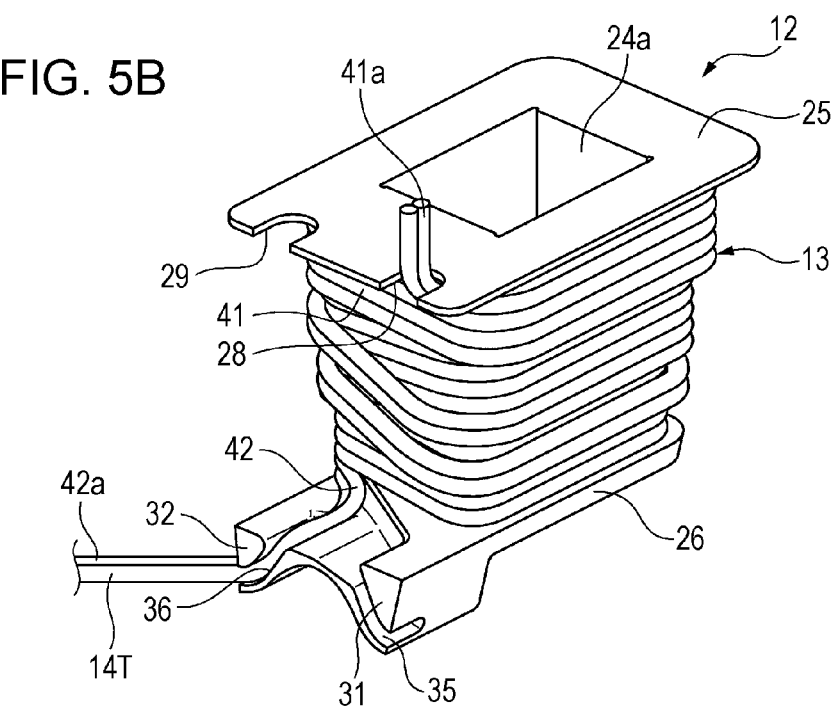
FIG. 5B is a second coil in which a wire is wound around an insulator.

Each of the coils 13 is formed by winding the bundle wire 14 a plurality of turns around the body portion 24 of the corresponding insulator 12. The embodiment adopts two types of coils 13 that are different in a manner of winding around the insulator 12. As illustrated in FIGS. 5A and 5B, a first winding end 41 of the coil 13 wound around the body portion 24 of the insulator 12 is located on a radial outer side of the body portion 24, and a second winding end 42 extends from a radial inner side to the radial outer side of the body portion 24 across a coil 13 of a different phase. As illustrated in FIG. 5A, the length of a first coil 13 is set such that a first winding end 41 is fitted in the groove 29 on the left side in the figure and an end portion 41a of the first winding end 41 slightly protrudes outward in the radial direction from the outer peripheral flange portion 25. Further, a second winding end 42 of the first coil 13 extends to a lower right side through the groove portion 35 while extending beside the radially inward inclined face 31a in the axial direction, and is retained by the inner winding support portion 31. As illustrated in FIG. 2, after coming out of the inner winding support portion 31, the second winding end 42 extends outward in the radial direction, and an end portion 42a thereof is joined to an end portion 41a of a first winding end 41 of a coil 13 of the same phase, which is adjacent in the circumferential direction, on a radial outer side of the groove 29. Hence, the length of the first coil 13, including a link portion 14T extending across a coil 13 of a different phase, is set such that the end portion 42a slightly protrudes outward in the radial direction from the outer peripheral flange portion 25.

As illustrated in FIG. 5B, the length of a second coil 13 is set such that a first winding end 41 is fitted in the groove 28 on the right side in the figure and an end portion 41a of the first winding end 41 slightly protrudes outward in the radial direction from the outer peripheral flange portion 25. Further, a second winding end 42 of the second coil 13 is wound on the inner winding support portion 32 and extends to the lower left side through the groove portion 36 while extending beside the radially inward inclined face 32a in the axial direction. As illustrated in FIG. 2, after coming out of the inner winding support portion 32, the second winding end 42 extends outward in the radial direction, and an end portion 42a thereof is joined to an end portion 41a of a first winding end 41 of a coil 13 of the same phase, which is adjacent in the circumferential direction, on a radial outer side of the groove 28. Hence, the length of the second coil 13, including a link portion 14T extending across a coil 13 of a different phase, is set such that the end portion 42a slightly protrudes outward in the radial direction from the outer peripheral flange portion 25.

Returning to FIG. 2, eight coils 13 correspond to each phase (U-phase, V-phase, and W-phase coils 13u, 13v, and 13w). The eight coils 13 are divided into two coil groups 18 (18u, 18v, and 18w) each including four coils and corresponding to half the circumference of the stator core 11. That is, the coils 13 in a coil group 18 formed in a counterclockwise direction with respect to the stator 10 (a coil group located on the left side of a boundary line P in FIG. 2) are formed by first coils 13, and the coils 13 in a coil group 18 formed in a clockwise direction with respect to the stator 10 are formed by second coils 13.

However, in the embodiment illustrated in FIG. 2, the first winding ends 41 of three coils 13 (13u, 13v, and 13w) to be connected to below-described neutral points, of the second coils 13 in the coil group 18 formed in the clockwise direction with respect to the stator 10, are inserted in the grooves 29, and the end portions 41a thereof are led out upward for easy connection to the neutral points. It is assumed that these three coils 13 are referred to as third coils 13. Alternatively, all coils 13 in the coil group 18 formed in the clockwise direction with respect to the stator 10 may be second coils 13. In this case, a manner of connection to the neutral points is different slightly.

Referring to FIG. 2, the bundle wires 14 led out from a pair of coils 13 of the same phase that are closest to each other on both sides of the boundary line P, more specifically, end portions 42a of second winding ends 42 of a first U-phase coil 13u in the U-phase coil group 18u formed in the counterclockwise direction with respect to the stator 10 and a second U-phase coil 13u in the U-phase coil group 18u formed in the clockwise direction with respect to the stator 10 are connected to a U-phase connection terminal 15u.

Similarly, end portions 42a of second winding ends 42 of a pair of V-phase coils 13v that are closest to each other on both sides of the boundary line P are connected to a V-phase connection terminal 15v, and end portions 42a of second winding ends 42 of a pair of W-phase coils 13w are connected to a W-phase connection terminal 15w.

At a position where the coil group 18 formed in the counterclockwise direction and the coil group 18 formed in the clockwise direction meet, that is, on a side opposite the connection terminals 15 of the phases (U-phase, V-phase, and W-phase connection terminals 15u, 15v, and 15w), end portions 41a of first winding ends 41 of adjacent coils 13, of six coils 13 provided on both sides of the boundary line P, which include a pair of coils of each phase, are connected by connecting lines 40, thereby forming neutral points.

The second winding end 42 of each first coil 13 in the coil group 18 formed in the counterclockwise direction extends through the groove portion 35 of the insulator 12 and is inserted in and retained by a groove portion 36 of an adjacent coil 13. The end portion 42a thereof is joined to an end portion 41a of a first winding end 41 extending outward in the radial direction from an outer peripheral flange portion 25 of a coil of the same phase that is adjacent in the circumferential direction.

Figure 6:
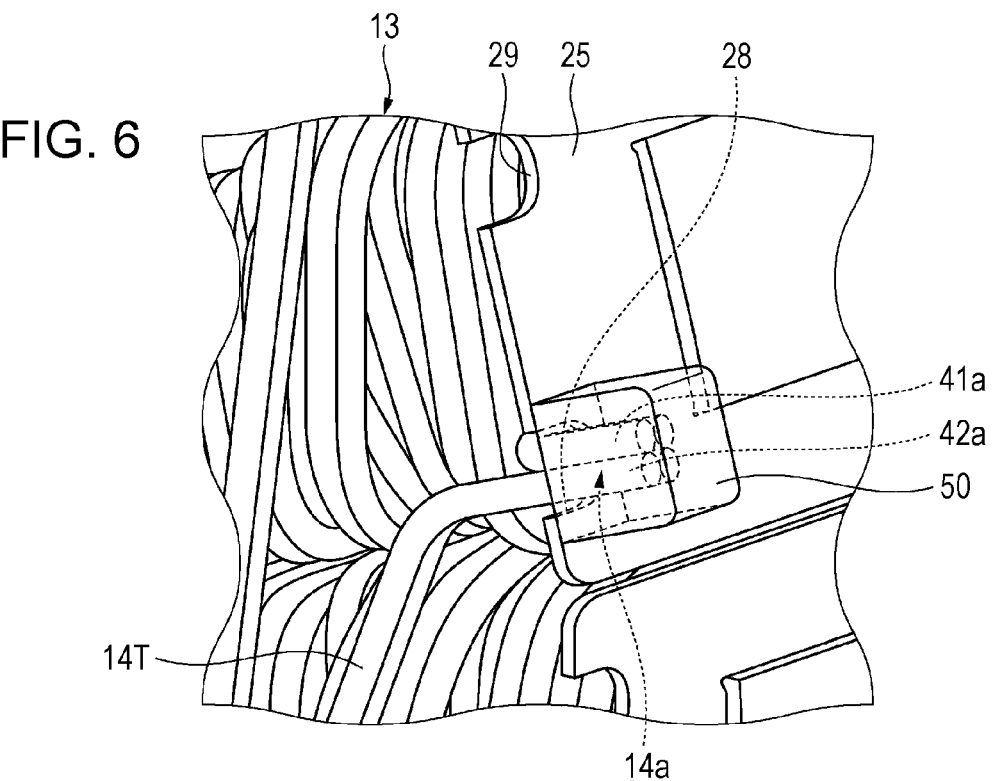
FIG. 6 is an enlarged perspective view of a joint portion of coil wires.

Similarly, the second winding end 42 of each second coil 13 in the coil group 18 formed in the clockwise direction extends through the groove portion 36 of the insulator 12 and is inserted in and retained by a groove portion 35 of an adjacent coil 13. The end portion 42a thereof is joined to an end portion 41a of a first winding end 41 extending outward in the radial direction from an outer peripheral flange portion 25 of a coil of the same phase that is adjacent in the circumferential direction. Also referring to FIG. 6, a joint portion 14a between the end portion 41a of the first winding end 41 and the end portion 42a of the second winding end 42 is fixed to the insulator 12 while being covered with an insulating material 50.

Next, a production procedure for the stator 10 will be described with reference to FIGS. 7 to 12. As illustrated in FIG. 12, first, twenty-four independent coils 13 are formed by winding bundle wires 14 around twenty-four insulators 12 in Step S1. Twelve coils 13 formed in the counterclockwise direction with respect to the stator 10, of the twenty-four coils 13, are wound in the above-described winding manner for the first coils 13. Of coils 13 formed in the clockwise direction with respect to the stator 10, nine coils 13 are wound in the winding manner for the second coils 13, and three coils 13 to be connected to the neutral points are wound in the winding manner for the third coils 13 such that end portions 41a of bundle wires 14 extending from first winding ends 41 are inserted in the grooves 29.

Next, in Step S2, the twelve insulators 12 around which the first coils 13 are wound are sequentially attached, in a counterclockwise order, to teeth 11b provided on the left side of an imaginary boundary line P on a stator core 11 (see FIG. 2). The nine insulators 12 around which the second coils 13 are wound are sequentially attached, in a clockwise order, to teeth 11b provided on the right side of the imaginary boundary line P on the stator core 11. Subsequently to the second coils 13, the remaining three insulators 12 around which the third coils 13 are wound are sequentially attached in a clockwise order. Since the coils 13 are independently wound around the insulators 12, they can be easily fitted on the teeth 11b. This enhances productivity.

In Step S3, wiring is performed while forming link portions 14T. More specifically, referring to FIG. 2, second winding ends 42 of the first coils 13 formed in the counterclockwise direction with respect to the stator 10 are inserted in groove portions 36 of adjacent insulators 12, and end portions 42a thereof are inserted in left grooves 29 of insulators 12 of coils of the same phase that are adjacent in the circumferential direction, whereby link portions 14T are formed. Further, an end portion 41a of a first winding end 41 of one of the coils 13 of the same phase (e.g., U-phase coils 13u) is aligned with an end portion 42a of a second winding end 42 of the other coil 13 in a groove 29.

Similarly, second winding ends 42 of the second coils 13 formed in the clockwise direction with respect to the stator 10 are inserted into groove portions 35 of adjacent coils 13, and end portions 42a thereof are inserted in right grooves 28 of insulators 12 of coils of the same phase that are adjacent in the circumferential direction, whereby link portions 14T are formed. Further, an end portion 41a of a first winding end 41 of one of the coils of the same phase (e.g., U-phase coils 13u) is aligned with an end portion 42a of a second winding end 42 of the other coil 13 in a groove 28.

In addition, substantially angular U-shaped connecting lines 40 connect end portions 41a of adjacent coils, of end portions 41a of the first winding ends 41 of the six coils 13 opposite the connection terminals 15 of the phases, that is, of three first coils 13 and three third coils 13 connected to the neutral points.

Figure 7:
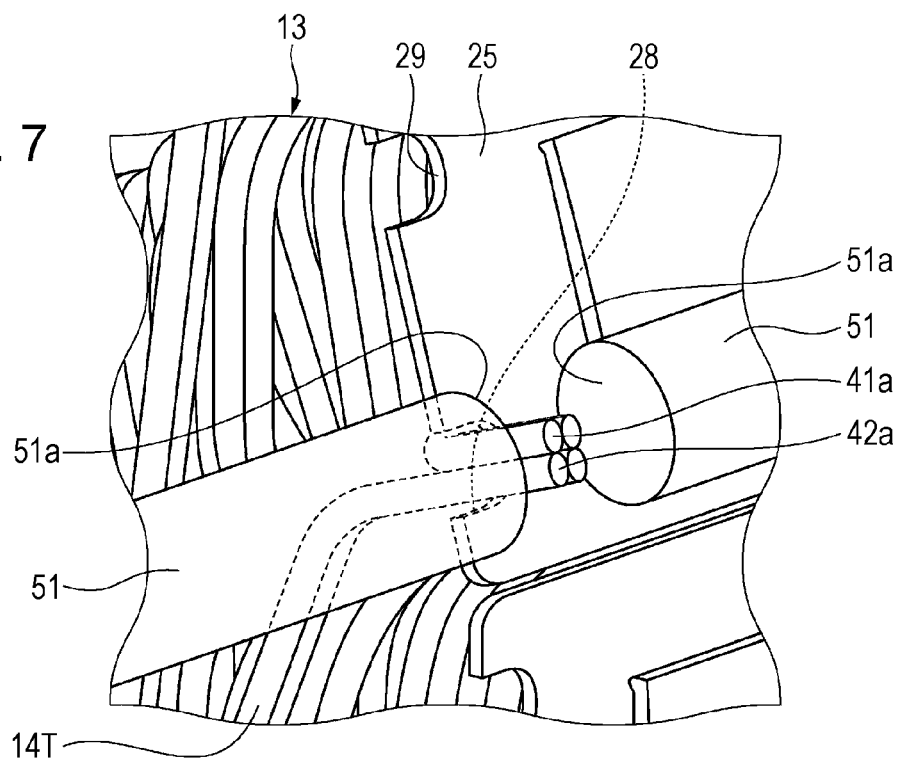
FIG. 7 is an enlarged perspective view illustrating a state in which ends of the coil wires are welded ultrasonically.

Next, as illustrated in FIG. 7, in Step S4, for example, the end portions 41a and 42a aligned in the grooves 28 and 29 and the connecting lines 40 are clamped by a pair of chips 51 of an ultrasonic welding device, and are joined by the application of ultrasonic waves. Prior to joint, insulation coatings are peeled from portions of the bundle wires 14 to be welded.

Figure 10:
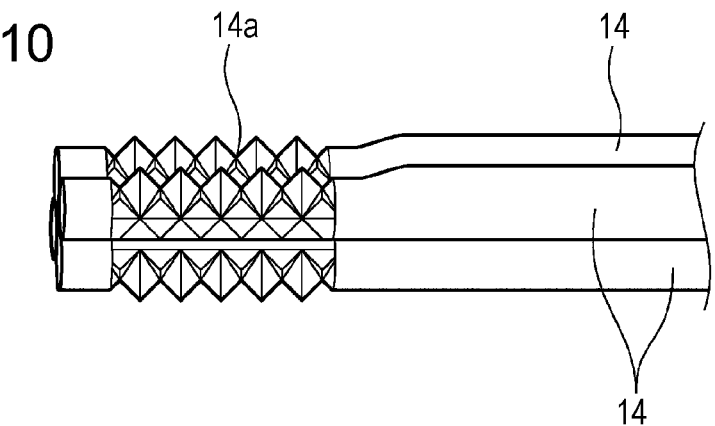
FIG. 10 is an enlarged perspective view of the joint portion.

Preferably, a surface of a joint portion 14a of the bundle wires 14 is provided with irregularities by forming irregularities on clamp faces 51a of the chips 51 that clamp the bundle wires 14, as illustrated in FIG. 10. This increases the separation strength between the joint portion 14a and an insulating material 50 when the joint portion 14a is covered with the insulating material 50, as will be described below. Hence, separation of the insulating material 50, for example, due to vibration, is prevented, and the insulation property is improved.

Figure 11A:
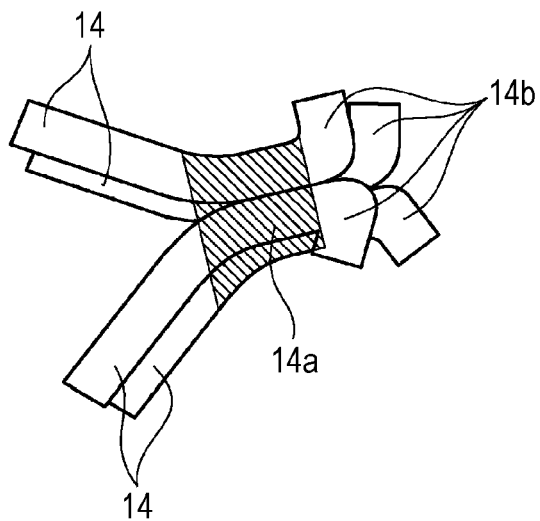
FIG. 11A is a perspective view illustrating a state in which non-joint portions at ends of joint portions are curved.
Figure 11B:
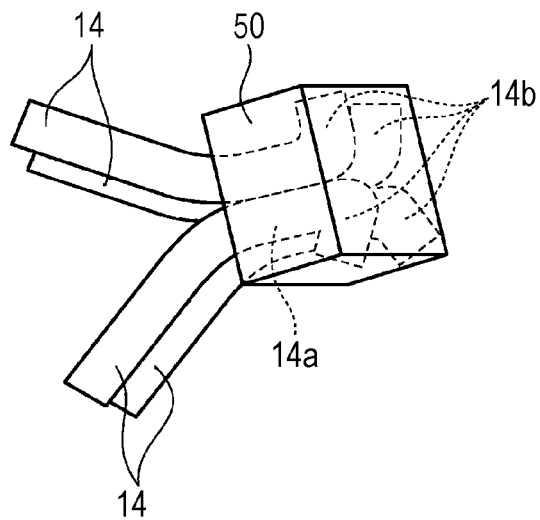
FIG. 11B is a perspective view illustrating a state in which the joint portions and the non-joint portions are fixed by an insulating material.
Figure 12:
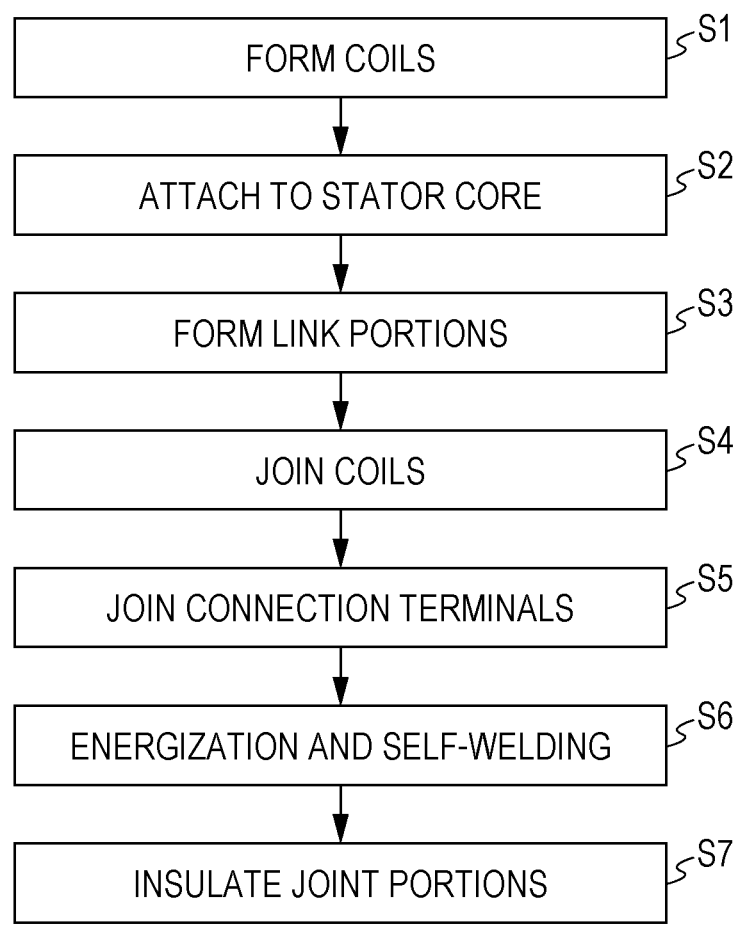
FIG. 12 is a flowchart showing a production procedure for a salient pole concentrated winding stator.
Figure 13:
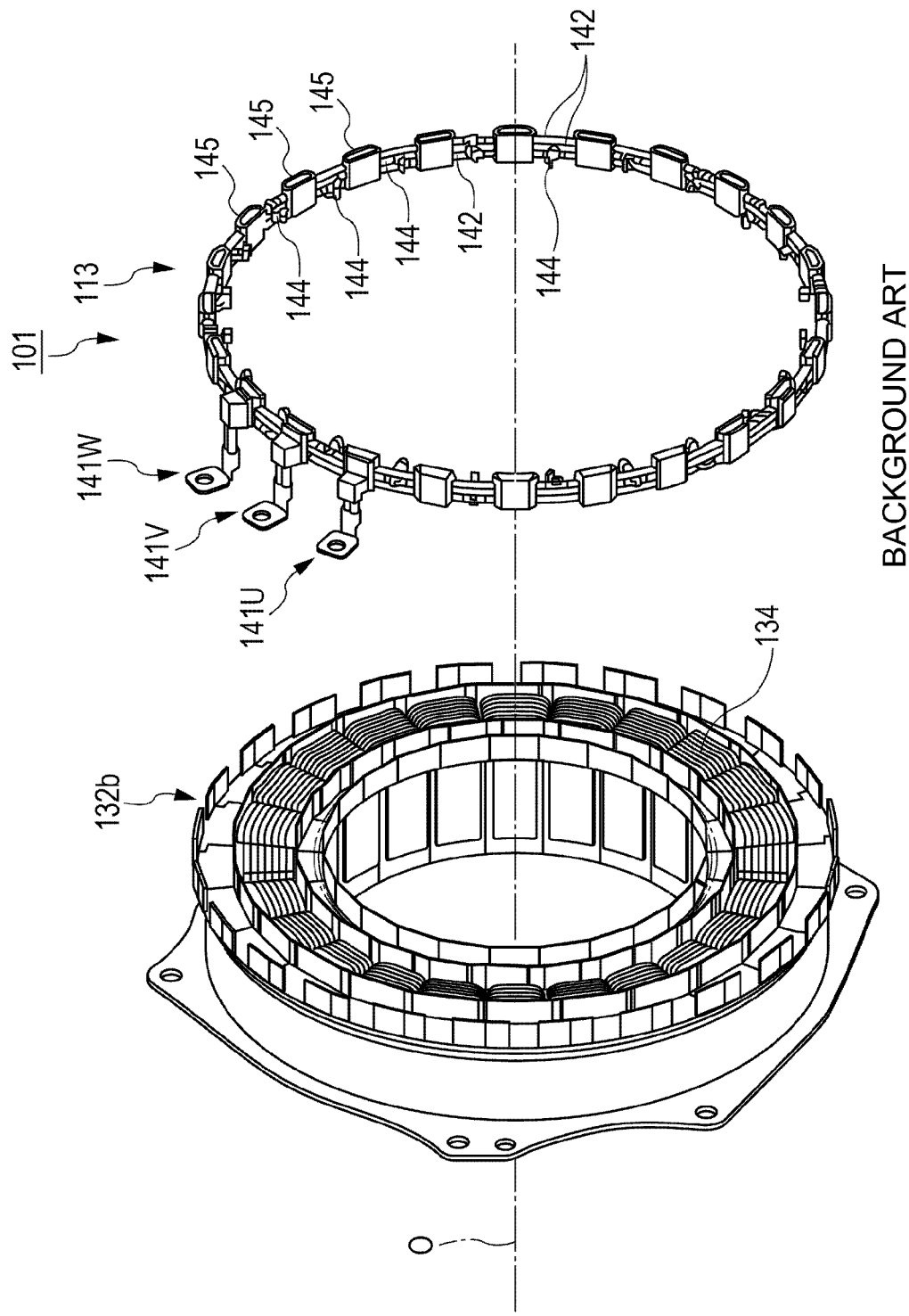
FIG. 13 is an exploded perspective view of a salient pole concentrated winding stator of the related art.

Another way to increase the separation strength between the joint portion 14a and the insulating material 50 is to curve (bend) an end (non-joint portions) 14b of the joint portion 14a of the bundle wires 14 so that the non-joint portions 14b separate from each other, as illustrated in FIG. 11. By covering the joint portion 14a and the non-joint portions 14b with the insulating material 50, the separation strength is increased. The time at which the non-joint portions 14b are bent is not particularly limited as long as the non-joint portions 14b are bent before the joint portion 14a and the non-joint portions 14b are covered with the insulating material 50. That is, the non-joint portions 14b may be bent before or after joint of the joint portion 14a.

In Step S5, the end portions 42a of the second winding ends 42 of a pair of coils 13 of the same phase that are located closest to both sides of the boundary line P are joined to a connection terminal 15 (15u, 15v, and 15w) corresponding to the phase.

Figure 8:
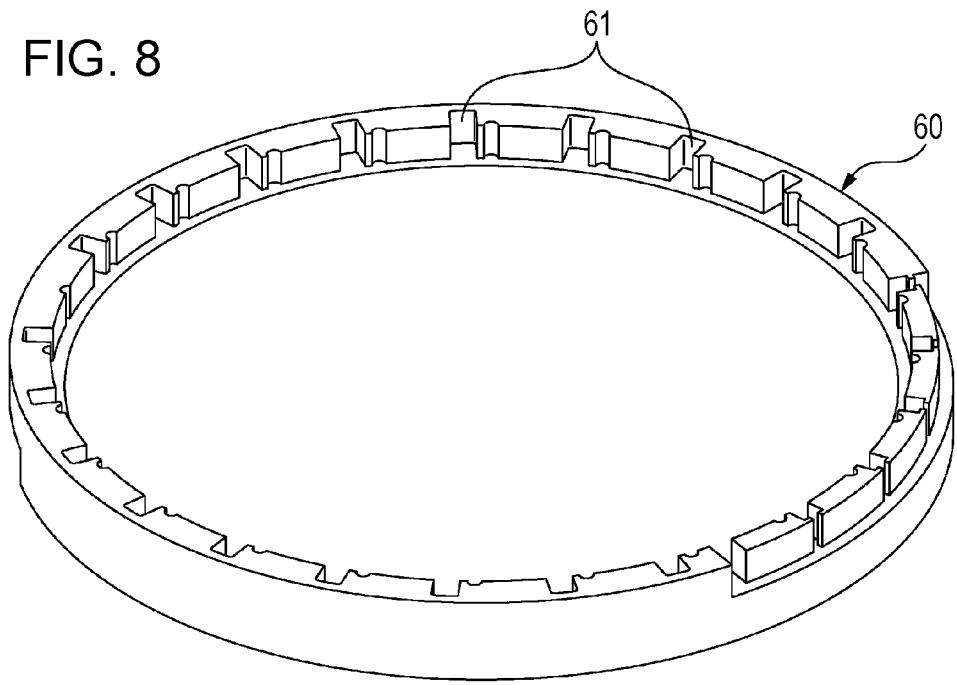
FIG. 8 is a perspective view of an insulating-material fixing jig.
Figure 9:
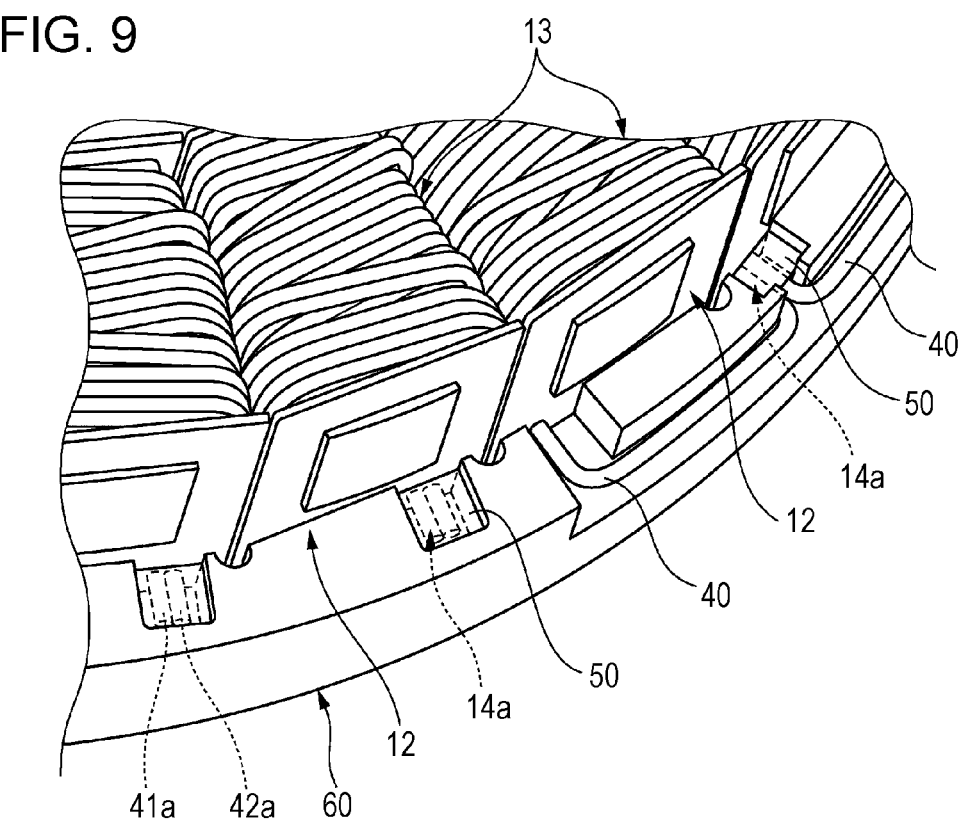
FIG. 9 is a principal perspective view illustrating a state in which the ends of the coil wires are fixed to insulators with insulating materials by the insulating-material fixing jig.

All joint portions 14a are further fixed by energizing the coils 13 (energization and self welding) in Step S6, and are then subjected to insulation in Step S7. More specifically, an annular insulating jig 60 illustrated in FIG. 8 is used. The insulating jig 60 has a plurality of (twenty-four in the embodiment) grooves 61 corresponding to the end portions 41a and 42 of the first and second winding ends 41 and 42 protruding outward from the stator 10 in the radial direction. The end portions 41a and 42a (joint portions 14a) of the first and second winding ends 41 and 42 are fitted and set in the grooves 61. Then, as illustrated in FIG. 9, the grooves 61 are filled with powder varnish serving as the insulating material 50. When the powder varnish is solidified by baking in a furnace, the joint portions 14a are each covered with the insulating material 50, and are fixed to the outer peripheral flange portions 25 of the insulators 12. Thus, the joint portions 14 are insulated.

As described above, according to the salient pole concentrated winding stator 10 for the electric motor of the embodiment, a plurality of coils 13 in the stator 10 have the first winding ends 41 located on the radial outer side at one axial end of the stator 10 and the second winding ends 42 located on the radial inner side at the one axial end of the stator 10. The second winding ends 42 extend across the coils 13 of the different phases in the circumferential direction, and each joint portion 14a where the end portion 41a of the first winding end 41 of one of the coils 13 of the same phase that are adjacent in the circumferential direction is directly joined to the end portion 42a of the second winding end 42 of the other coil 13 is covered with the insulating material 50. Therefore, the end portions 41a and 42a of the first and second winding ends 41 and 42 are directly joined without using any electric-power collection/distribution member. This reduces the number of components and cost. Further, since the joint portion 14a is covered with the insulting material 50, insulation can be ensured while reducing the amount of insulating material 50. Alternatively, the first winding ends 41 may extend across the coils 13 of the different phases in the circumferential direction.

Since the joint portion 14a is fixed by the insulating material 50 to the insulator 12 attached to the corresponding tooth 11b, it is possible to improve insulation of the joint portion 14a, to suppress vibration of the joint portion 14a and rise of the wires 14 resulting from vibration, and to suppress damage to the wires 14.

Further, each of the insulators 12 includes the body portion 24 around which the coil 13 is wound, and the flange portion 25 projecting from the body portion 24 in the axial direction and having the grooves 28 and 29 at an end in the axial direction. The joint portion 14a is formed by directly joining the end portion 41a of the first winding end 41 and the end portion 42a of the second winding end 42 protruding from each of the grooves 28 and 29, and is fixed to the flange portion 25 of the insulator 12 with the insulating material 50. Hence, the joint portion 14a and the insulating material 50 can be fixed at a position of the tooth 11b shifted in the axial direction. This reduces the limitations placed on the position of the rotor 6 opposing the stator 10 by the joint portion 14a and the insulating material 5, and therefore, the degree of flexibility in locating the rotor 6 is increased.

Since the surface of the joint portion 14a has irregularities, the frictional force between the joint portion 14a and the insulating materials 50 increases. This prevents the insulating material 50 from falling off the joint portion 14a, and ensures more reliable insulation of the joint portion 14a.

The end portions 41a and 42a of the first and second winding ends 41 and 42 may have, at an end beyond the joint portion 14a, the non-joint portions 14b. By curving the non-joint portions 14b relative to the joint portion 14a and covering the joint portion 14a and the non-joint portions 14b with the insulating material 50, the insulating material 50 can be prevented from falling off the joint portion 14a, and more reliable insulation of the joint portion 14a is ensured.

In the stator core 11, the annular portion 11a is provided integrally with a plurality of teeth 11b radially projecting from the annular portion 11a, that is, the stator core 11 is not split. Hence, leakage of flux from split portions of the stator core 11 does not occur. This reduces the loss and enhances the motor performance.

In addition, since the teeth 11b project outward from the annular portion 11a in the radial direction, the coils 13 can be attached to the teeth 11b from the radial outer side of the stator core 11. This facilitates production of the stator 10 and enhances productivity.

The present invention is not limited to the above-described embodiment, and appropriate modifications and improvements can be made. While the salient pole concentrated winding stator for the outer rotor type electric motor has been described above, the present invention is not limited thereto. The present invention can be similarly applied to other types of stators, for example, a stator for an inner rotor type electric motor in which a plurality of teeth project inward from an annular portion of a stator core in the radial direction, and a stator including a split core. Further, insulating paper may be used instead of the insulators 12.

A salient pole concentrated winding stator for an electric motor (e.g., a salient pole concentrated winding stator 10 in the embodiment) according to of the embodiment of the present invention includes an annular stator core (e.g., a stator core 11 in the embodiment) including a plurality of teeth (e.g., teeth 11b in the embodiment) arranged at predetermined intervals in a circumferential direction and projecting radially; and a plurality of coils (e.g., coils 13 in the embodiment) wound around the teeth such as to have different phases on the teeth adjacent in the circumferential direction. Each of the coils includes a first winding end (e.g., a first winding end 41 in the embodiment) located on a radial outer side at one axial end of the stator and a second winding end (e.g., a second winding end 42 in the embodiment) located on a radial inner side at the one axial end of the stator, and at least one of the first winding end and the second winding end extends across the coil of a different phase in the circumferential direction. An end portion (e.g., an end portion 41a in the embodiment) of the first winding end of one of the coils of the same phase that are adjacent in the circumferential direction is directly joined to an end portion (e.g., an end portion 42a) of the second winding end of the other coil to form a joint portion (e.g., a joint portion 14a in the embodiment) without using an electric-power collection/distribution member. The joint portion is covered with an insulating material (e.g., an insulating material 50 in the embodiment).

In this case, since the end portions of the first and second winding ends are directly joined without using any electric-power collection/distribution member, the number of components and production cost can be reduced. Further, since the joint portion is covered with the insulating material, insulation can be ensured while reducing the amount of insulating material.

Preferably, the coils are wound around insulators (e.g., insulators 12 in the embodiment) to be attached to the teeth, and the joint portion is fixed to the corresponding insulator with the insulating material.

In this case, it is possible to improve insulation of the joint portion, to suppress vibration of the joint portion and rise of a wire resulting from vibration, and to suppress damage to the wire.

Preferably, each of the insulators includes a body portion (e.g., a body portion 24 in the embodiment) around which the corresponding coil is wound, and a flange portion (e.g., a flange portion 25 in the embodiment) projecting from the body portion toward the one axial end. The flange portion has a groove (e.g., grooves 28 and 29 in the embodiment) in an end portion at the one axial end. The joint portion is formed by directly bonding the end portions of the first winding end and the second winding end protruding from the groove, and is fixed to the flange portion of the insulator with the insulating material.

In this case, the joint portion and the insulating material are fixed to a position shifted relative to the teeth in the axial direction. This reduces the limitations placed on the position of a rotor opposing the stator by the joint portion and the insulating material, and therefore, the degree of flexibility in locating the rotor increases.

Preferably, a surface of the joint portion has irregularities.

In this case, frictional force between the joint portion and the insulating material increases. This prevents the insulating material from falling off the joint portion, and ensures more reliable insulation of the joint portion.

Preferably, the end portions of the first winding end and the second winding end have non-joint portions (e.g., non-joint portions 14b in the embodiment) that are not joined at an end beyond the joint portion. The non-joint portions are curved relative to the joint portion. The joint portion and the non-joint portions are covered with the insulating material.

In this case, the insulating material is prevented from falling off the joint portion, and this ensures more reliable insulation of the joint portion.

Preferably, the stator core further includes an annular portion (e.g., an annular portion 11a in the embodiment), and the teeth integrally and radially project from the annular portion.

In this case, since the stator core is not split, leakage of flux from split portions of the stator core does not occur. This reduces the loss and enhances the motor performance.

Preferably, the teeth project from an annular portion toward the radial outer side.

In this case, the coils can be attached to the teeth from the radial outer side of the stator core. This facilitates production of the stator and enhances productivity.

Obviously, numerous modifications and variations of the present invention are possible in light of the above teachings. It is therefore to be understood that within the scope of the appended claims, the invention may be practiced otherwise than as specifically described herein.

What is claimed is:

1. A salient pole concentrated winding stator for an electric motor, comprising:
    an annular stator core including a plurality of teeth arranged at predetermined intervals in a circumferential direction and projecting radially; and
    a plurality of coils wound around the teeth such as to have different phases on the teeth adjacent in the circumferential direction,
    wherein each of the coils includes a first winding end located on a radial outer side at one axial end of the stator and a second winding end located on a radial inner side at the one axial end of the stator, and at least one of the first winding end and the second winding end extends across the coil of a different phase in the circumferential direction, the plurality of coils being configured such that the conductive wires are covered with insulation coatings,
    wherein an end portion of the first winding end of one of the coils of the same phase that are adjacent in the circumferential direction is directly joined to an end portion of the second winding end of the other coil to form a joint portion without using an electric-power collection/distribution member,
    wherein the insulation coatings are respectively removed from the end portion of the first winding end and the end portion of the second winding end, and
    wherein the joint portion is covered with an insulating material, and an end surface of the first winding end and an end surface of the second winding end are arranged inside of the insulating material.

2. The salient pole concentrated winding stator according to claim 1,
    wherein the coils are wound around insulators to be attached to the teeth, and
    wherein the joint portion is fixed to the corresponding insulator with the insulating material.

3. The salient pole concentrated winding stator according to claim 2,
    wherein each of the insulators includes a body around which the corresponding coil is wound, and a flange projecting from the body toward the one axial end,
    wherein the flange has a groove in an end portion at the one axial end, and
    wherein the joint portion is formed by directly bonding the end portions of the first winding end and the second winding end protruding from the groove, and is fixed to the flange of the insulator with the insulating material.

4. The salient pole concentrated winding stator according to claim 1, wherein a surface of the joint portion has irregularities.

5. The salient pole concentrated winding stator according to claim 1,
    wherein the end portions of the first winding end and the second winding end have non-joint portions that are not joined at an end beyond the joint portion,
    wherein the non-joint portions are curved relative to the joint portion, and
    wherein the joint portion and the non-joint portions are covered with the insulating material.

6. The salient pole concentrated winding stator according to claim 1,
    wherein the stator core further includes an annular portion, and the teeth integrally and radially project from the annular portion.

7. The salient pole concentrated winding stator according to claim 1, wherein the teeth project from an annular portion toward the radial outer side.

8. The salient pole concentrated winding stator according to claim 2, wherein the insulator has a rectangular hole penetrating the insulator radially, and each of the teeth is inserted in the rectangular hole.

9. The salient pole concentrated winding stator according to claim 1, wherein the end portion of the first winding end and the end portion of the second winding end extend substantially parallel to each other.

10. The salient pole concentrated winding stator according to claim 1, wherein the joint portion is encapsulated within the insulating material.

11. The salient pole concentrated winding stator according to claim 1, wherein the end surface of the first winding end and the end surface of the second winding end are entirely covered by the insulating material.

12. A salient pole concentrated winding stator for an electric motor, comprising:
- an annular stator core including a plurality of teeth arranged at predetermined intervals in a circumferential direction and projecting radially; and
- a plurality of coils wound around the teeth such as to have different phases on the teeth adjacent in the circumferential direction,
- wherein each of the coils includes a first winding end located on a radial outer side at one axial end of the stator and a second winding end located on a radial inner side at the one axial end of the stator, and at least one of the first winding end and the second winding end extends across the coil of a different phase in the circumferential direction,
- wherein an end portion of the first winding end of one of the coils of the same phase that are adjacent in the circumferential direction is directly joined to an end portion of the second winding end of the other coil to form a joint portion without using an electric-power collection/distribution member,
- wherein the joint portion is covered with an insulating material,
- wherein the coils are wound around insulators to be attached to the teeth,
- wherein the joint portion is fixed to the corresponding insulator with the insulating material,
- wherein each of the insulators includes a body around which the corresponding coil is wound, and a flange projecting from the body toward the one axial end,
- wherein the flange has a groove in an end portion at the one axial end, and
- wherein the joint portion is formed by directly bonding the end portions of the first winding end and the second winding end protruding from the groove, and is fixed to the flange of the insulator with the insulating material.

13. A salient pole concentrated winding stator for an electric motor, comprising:
- an annular stator core including a plurality of teeth arranged at predetermined intervals in a circumferential direction and projecting radially; and
- a plurality of coils wound around the teeth such as to have different phases on the teeth adjacent in the circumferential direction,
- wherein each of the coils includes a first winding end located on a radial outer side at one axial end of the stator and a second winding end located on a radial inner side at the one axial end of the stator, and at least one of the first winding end and the second winding end extends across the coil of a different phase in the circumferential direction,
- wherein an end portion of the first winding end of one of the coils of the same phase that are adjacent in the circumferential direction is directly joined to an end portion of the second winding end of the other coil to form a joint portion without using an electric-power collection/distribution member,
- wherein the joint portion is covered with an insulating material,
- wherein the end portions of the first winding end and the second winding end have non-joint portions that are not joined at an end beyond the joint portion,
- wherein the non-joint portions are curved relative to the joint portion, and
- wherein the joint portion and the non-joint portions are covered with the insulating material.

* * * * *